United States Patent
Skaarup Jensen et al.

(10) Patent No.: US 6,902,714 B2
(45) Date of Patent: Jun. 7, 2005

(54) METHOD FOR REDUCING THE $SO_2$ EMISSION FROM A PLANT FOR MANUFACTURING CEMENT CLINKER AND SUCH PLANT

(75) Inventors: Lars Skaarup Jensen, Vallensbaek (DK); Ebbe Skyum Jöns, Vaerlose (DK)

(73) Assignee: F. L. Smidth A/S, Valby (DK)

(*) Notice: Subject to any disclaimer, the term of this patent is extended or adjusted under 35 U.S.C. 154(b) by 30 days.

(21) Appl. No.: 10/380,668

(22) PCT Filed: Sep. 19, 2001

(86) PCT No.: PCT/IB01/01713

§ 371 (c)(1),
(2), (4) Date: Mar. 18, 2003

(87) PCT Pub. No.: WO02/28512

PCT Pub. Date: Apr. 11, 2002

(65) Prior Publication Data

US 2004/0040441 A1 Mar. 4, 2004

(30) Foreign Application Priority Data

Oct. 5, 2000 (DK) .......................... 2000 01479

(51) Int. Cl.[7] .......................... B01D 53/50; F27B 15/00
(52) U.S. Cl. .............................. 423/244.09; 423/244.1; 432/14; 432/58
(58) Field of Search .................. 423/244.09, 244.1, 423/244.01; 422/190, 198, 211, 219, 232; 432/14, 58

(56) References Cited

U.S. PATENT DOCUMENTS

| | | | | |
|---|---|---|---|---|
| 4,130,441 A | * | 12/1978 | Nudelman et al. | 106/768 |
| 4,404,032 A | * | 9/1983 | Nudelman et al. | 106/755 |
| 4,634,583 A | * | 1/1987 | Wolter et al. | 423/244.07 |
| 5,259,876 A | * | 11/1993 | Enkegaard | 106/761 |
| 5,618,508 A | | 4/1997 | Suchenwirth | |
| 5,927,967 A | * | 7/1999 | Bauer et al. | 432/72 |

FOREIGN PATENT DOCUMENTS

| | | | |
|---|---|---|---|
| CA | 1162031 | * | 2/1984 |
| DE | 37 28 128 C1 | | 3/1989 |
| DE | 195 11 304 A1 | | 10/1996 |
| JP | 49-120884 | * | 11/1974 |
| JP | 56-37028 | * | 4/1981 |
| WO | WO 93/10884 A1 | | 6/1993 |
| WO | WO 00/78435 A1 | | 12/2000 |

* cited by examiner

Primary Examiner—Stanley S. Silverman
Assistant Examiner—Ardith E. Hertzog
(74) Attorney, Agent, or Firm—Jeffrey S. Melcher; Manelli Dension & Selter, PLLC

(57) ABSTRACT

Provided is a method and plant for reducing $SO_2$ emissions in which a catalyst for catalyzing the formation of cement clinker is extracted from kiln exhaust gas and recycled.

29 Claims, 1 Drawing Sheet

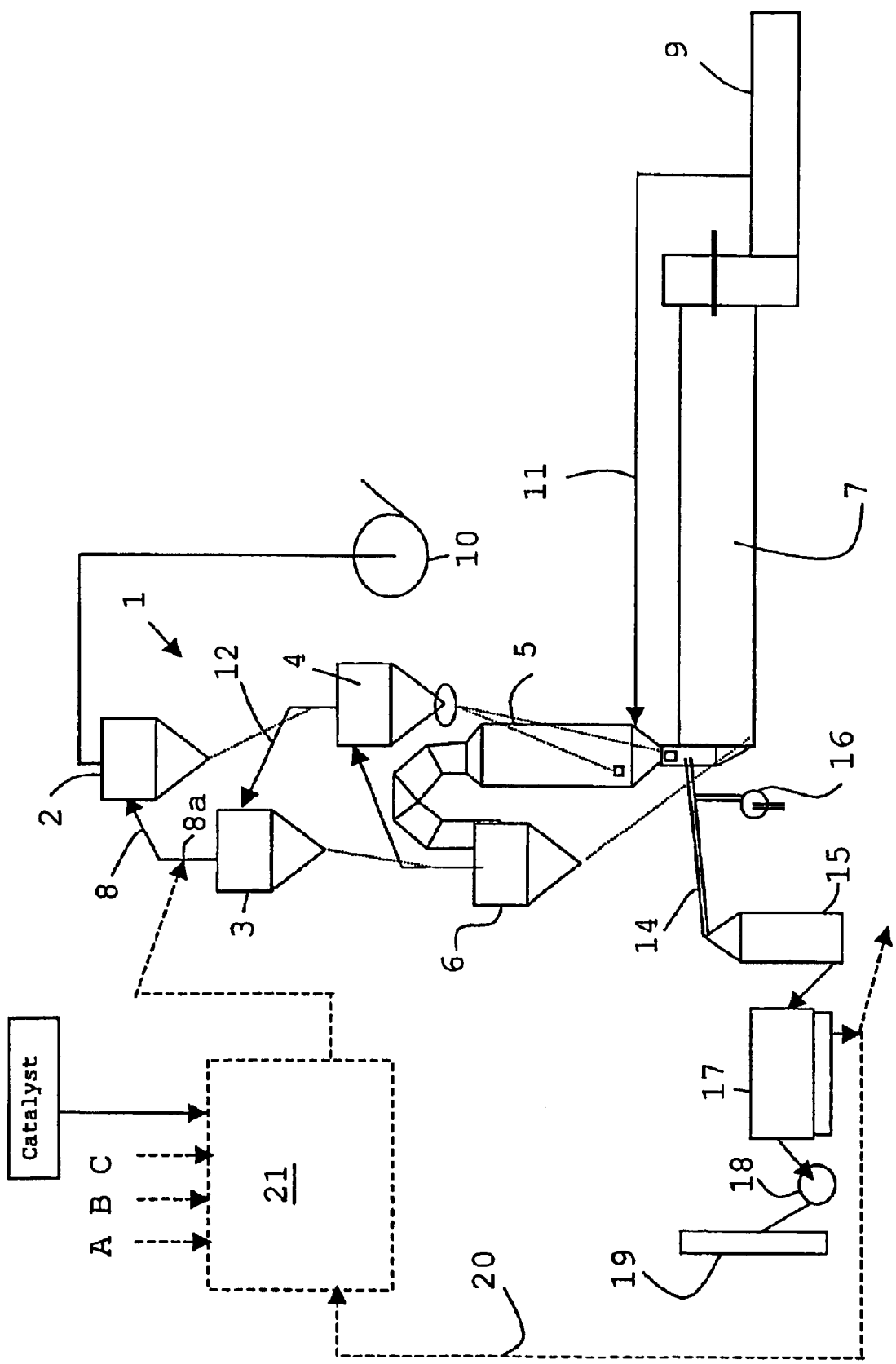

METHOD FOR REDUCING THE SO₂ EMISSION FROM A PLANT FOR MANUFACTURING CEMENT CLINKER AND SUCH PLANT

FIELD OF INVENTION

The present invention relates to a method for reducing the $SO_x$ emission from a plant for manufacturing cement clinker by which cement raw meal is preheated and burned in a plant comprising a cyclone preheater and a kiln. The invention also relates to a plant for carrying out the method.

BACKGROUND OF INVENTION

Plants of the aforementioned kind for manufacturing cement clinker are generally known from the literature.

The emission of $SO_2$ from such modern kiln plants for manufacturing cement clinker is normally relatively low due to the fact that the sulphur contained in the fuel input for the kiln and for any calciner is bound very effectively in the form of sulphate which is discharged from the kiln embedded in the clinker. However, a certain emission from the preheater may occur if the utilized raw materials contain sulphide as is the case in the frequently occuring minerals pyrite and marcasite.

The reason for this is that pyrite $FeS_2$ is decomposed in the preheater at temperatures around 550° C. according to the equation:

$$FeS_2 = FeS + S \qquad (1)$$

whereafter the evaporated S is immediately converted by burning into $SO_2$. FeS is somewhat more resistant and reaches the calcining zone before it is burned, and the $SO_2$ thus generated is subsequently bound by CaO in similar way as that produced from the fuel. This happens in accordance with the reaction equation:

$$SO_2 + CaO + \tfrac{1}{2}O_2 = CaSO_4 \qquad (2)$$

In case of a pyrite content in the raw materials, there is a risk that about one half of the sulphur content may escape in the form of $SO_2$.

To reduce the extent of any such $SO_2$ escape, it is known practice to introduce an absorbent in the form of CaO, $Ca(OH)_2$ or other basic components at some location in the preheater so that $SO_2$ can be bound in the form of sulphite:

$$CaO + SO_2 = CaSO_3 \qquad (3)$$

At a subsequent stage of the process, sulphite will be converted into sulphate.

A significant disadvantage of this known method is that it involves use of a surplus amount of absorbent, making the method relatively costly, particularly if the absorbent which is being used has to be purchased from an external source.

From WO 93/10884 a method is known by which exhaust gases containing CaO-laden dust are extracted from a location near the calciner and directed to the location in the preheater where the absorption of $SO_2$ is to take place. The method works, but it requires a quite substantial surplus amount of CaO, thus somewhat reducing the efficiency of the preheater as a heat exchange unit.

The Danish patent application No. PA 1999 00867 provides an improved method by which calcined cement raw meal is extracted, slaked and ground before it is introduced into the preheater. However, this method also has the disadvantage of reduced efficiency of the preheater as a heat exchange unit.

SUMMARY OF INVENTION

The purpose of the present invention is to provide a method as well as a plant for manufacturing cement clinker by means of which a cheap and effective reduction of the $SO_x$ emission is achieved without entailing a noteworthy reduction in the efficiency of the preheater.

This is achieved by a method of the kind mentioned in the introduction, and being characterized in that a catalyst in the form of a chloride compound and/or a mixture of several chloride compounds, having the property that it will be present in solid or melted form in the zone of the preheater where $SO_2$ is formed, and it thus must be effective, and in vaporized form in the kiln, is introduced into the preheater at its uppermost or next-to-uppermost cyclone stage, that the catalyst is directed down through the preheater to the kiln, that a partial amount of the kiln exhaust gas stream containing the catalyst in vaporized form is extracted from the kiln, that the extracted exhaust gas stream is cooled off so that the catalyst is present in solid form, that solid matter is separated from the cooled exhaust gas stream and that at least some of the separated solid matter containing the catalyst is recirculated for renewed introduction into the preheater.

Hereby is obtained an effective reduction of the $SO_2$ emission. The reason for this is the surprising observation that chloride compounds and/or a mixture of several chloride compounds having the aforementioned properties in respect to melting point and boiling point will promote the reaction catalytically according to the equation $$CaO + SO_2 = CaSO_3 \qquad (3)$$

and it will further promote the reaction:

$$CaCO_3 + SO_2 = CaSO_3 + CO_2 \qquad (4)$$

So, surprisingly, it has proved possible to catalyze that $SO_2$ reacts with calcium carbonate $CaCO_3$, which, as it is, constitutes about 80% of the raw materials. Since one reactant, namely $CaCO_3$ is present in great abundance, the $SO_2$ reduction may be effected without any use of extraneous chemicals, and, furthermore, the reaction, and hence the $SO_2$ reduction must be assumed to be approximately complete.

The plant for carrying out the method according to the invention is characterized in that it comprises means for introducing a catalyst into the preheater at its uppermost or next-to-uppermost cyclone stage as well as a bypass system comprising means for extracting a partial exhaust gas stream from the kiln, means for cooling the extracted exhaust gas stream, means for separating solid matter from the cooled exhaust gas stream, and means for recirculating at least a part of the separated solid matter containing the catalyst for renewed introduction into the preheater.

BRIEF DESCRIPTION OF DRAWINGS

FIG. 1 illustrates a method and plant for producing cement clinker having reduced $SO_2$, emissions.

DETAILED DESCRIPTION OF INVENTION

Additional characteristics of the plant will be apparent from the detailed description provided in the following.

The catalyst may be separately introduced into the preheater. However, it is preferred that the catalyst is mixed with the raw materials, preferentially in the raw mill plant, thereby introducing it into the preheater together with the raw materials. It is also preferred that the separated solid matter containing the catalyst which is recirculated for renewed introduction, is mixed with the raw materials in the raw mill plant. In cases where the amount of recirculated catalyst is insufficient, it will be possible to supplement with fresh catalyst.

Various chloride compounds such as $CaCl_2$, KCl, NaCl, $MnCl_2$ and $FeCl_3$ may be used as the catalyst. The chloride compounds may be separately used, but in order to attain a catalyst having the appropriate properties, particularly in respect to the melting point, it is preferred that a mixture of different chloride compounds is used. Since $SO_2$ is essentially formed in the preheater at a temperature above 550° C., the melting point of the catalyst should advantageously be less than 550° C. at a pressure of 1 atmosphere.

A number of existing kiln plants incorporate a bypass system designed for venting chloride and alkali metals from the kiln system. In such cases, the bypass system will also be used for extracting, cooling and separating kiln exhaust gases which contain the catalyst. However, in this case the separated solid matter will contain constituents such as Cl, Na and K which are undesirable elements in the cement, and, therefore, only a portion of this material will be recirculated for renewed introduction into the preheater, and, furthermore, this will make it necessary to supplement with fresh catalyst.

The invention will be explained in further details in the following with reference being made to the drawing which is diagrammatic, with its only FIGURE showing a plant for carrying out the method according to the invention.

In the FIGURE is seen a cement manufacturing plant comprising a cyclone preheater 1 consisting of the cyclones 2, 3 and 4, a calciner 5 with a subsequent separating cyclone 6 and a rotary kiln 7. The plant further comprises a clinker cooler 9 for cooling of burned cement clinker, and a duct 11 for conducting preheated cooling air to the calciner 5. Raw material from a raw mill plant 21 is introduced into an exhaust gas duct 8, which connects the two uppermost cyclones 2, 3 of the preheater and it is preheated in counterflow to the exhaust gas on its passage through the three cyclones, whereafter it is calcined in the calciner 5. From the bottom outlet of the separating cyclone 6 the calcined raw material is routed to the rotary kiln 7. The exhaust gas from the rotary kiln 7 and the calciner 5 is drawn from the calciner 5 through the cyclone 6 and up through the preheater 1 by means of a fan 10.

According to the invention a catalyst is supplied in the form of a chloride compound and/or a mixture of several chloride compounds into the preheater at its uppermost or next-to-uppermost cyclone stage which constitute the zone of the preheater in which $SO_2$ is formed. The catalyst can be separately supplied into the exhaust gas duct 8 via an opening 8a or in the corresponding exhaust gas duct 12 which connects the cyclone 4 with cyclone 3. However, it is preferred that the catalyst is supplied to the raw mill plant 21 in order to attain an effective mixture with the raw materials and that the catalyst is thereby supplied to the preheater via the opening 8a intermingled with the raw materials.

Subsequently, the catalyst will be carried, together with the raw materials, down through the preheater 1 to the kiln 7. In the preheater the catalyst will catalyze the absorption of $SO_2$ by promoting its reaction with CaO for formation of $CaSO_3$ and also its reaction with $CaCO_3$ for formation of $CaSO_3$ and $CO_2$. The formed $CaSO_3$ will react further to form $CaSO_4$ which will be discharged from the kiln embedded in the clinker.

Having completed its task in the preheater, the catalyst will end up in the rotary kiln where, due to the prevailing kiln temperature of more than 1100° C., the catalyst will be present in vaporized form which is an essential condition for extracting the catalyst from the kiln system. This is done by means of a duct 14 by extracting a partial exhaust gas stream which contains the catalyst in vaporized form and dust, and flowing out of the material inlet end of the rotary kiln.

The extracted exhaust gas stream is then cooled partly by injecting air into the duct 14 via the air injection means 16 and partly in a conditioning tower 15 subject to the injection of water, so that the catalyst is present in solid form. The catalyst will essentially be condensed to the dust in the form of alkali chloride during the cooling process.

After cooling, solid matter is separated from the cooled exhaust gas stream in a filter arrangement 17 wherefrom the filtered exhaust gas stream, via a fan 18 and a stack 19, is released into the atmosphere, whereas at least a portion of the filtered-off material containing the catalyst is recirculated to the raw mill plant 21 or alternatively directly to the preheater by means of unspecified conveying means 20 for renewed introduction into the preheater. Here the raw mill plant is shown merely as a box to which is added a number of raw material components A, B and C and possibly a catalyst.

What is claimed is:

1. A method for reducing the $SO_2$ emission from a plant for manufacturing cement clinker by which cement raw meal is preheated and burned in the plant comprising a cyclone preheater and a kiln in communication with the cyclone preheater, the method comprising:

introducing a catalyst into an uppermost or next-to-uppermost cyclone stage of the cyclone preheater, the catalyst comprising at least one of a chloride compound or a mixture of several chloride compounds, and the catalyst being present in solid or melted form in a zone of the cyclone preheater where $SO_2$ is formed and the catalyst being in vaporized form in the kiln;

directing the catalyst down through the cyclone preheater and then into the kiln where the catalyst is vaporized;

extracting a partial amount of a kiln exhaust gas stream containing vaporized catalyst;

cooling the extracted kiln exhaust gas to solidify catalyst and form solid catalyst;

separating the solid catalyst from the kiln exhaust gas to form recycled catalyst; and introducing at least some of the recycled catalyst as catalyst into the uppermost or next-to-uppermost cyclone stage of the cyclone preheater.

2. The method according to claim 1, wherein the catalyst is mixed with raw materials to form a mixture of catalyst and raw materials, and introducing the mixture of catalyst and raw materials into the cyclone preheater.

3. The method according to claim 2, wherein the catalyst and raw materials are mixed in a raw mill plant that is in communication with the preheater.

4. The method according to claim 1, wherein the recycled catalyst is mixed with raw materials in a raw mill plant and the mixture of recycled catalyst and raw materials is introduced into the cyclone preheater.

5. The method according to claim 4, wherein fresh catalyst is supplemented with recycled catalyst mixed with raw materials at the raw mill plant.

6. The method according to claim 1, wherein the catalyst comprises at least one selected from the group consisting of $CaCl_2$, KCl, NaCl, $MnCl_2$, $FeCl_3$, and mixtures thereof.

7. The method according to claim 6, wherein the catalyst has a melting point of less than 550° C. at a pressure of 1 atmosphere.

8. The method according to claim 1, wherein the catalyst is separately introduced into the cyclone preheater.

9. The method according to claim 1, wherein the catalyst comprises $CaCl_2$.

10. The method according to claim 1, wherein the catalyst comprises KCl.

11. A The method according to claim 1, wherein the catalyst comprises NaCl.

12. The method according to claim 1, wherein the catalyst comprises $MnCl_2$.

13. The method according to claim 1, wherein the catalyst comprises $FeCl_3$.

14. A plant for manufacturing cement clinker having reduced $SO_2$ emission comprising:

a cyclone preheater;

a kiln in communication with the preheater, means for introducing a catalyst into an uppermost or next-to-uppermost cyclone stage of the cyclone preheater, the catalyst comprising at least one of a chloride compound or a mixture of several chloride compounds, and the catalyst being present in solid or melted form in a zone of the cyclone preheater where $SO_2$ is formed and the catalyst being in vaporized form in the kiln; and a bypass system comprising:

means for extracting a partial amount of a kiln exhaust gas stream containing vaporized catalyst;

means for cooling the extracted kiln exhaust gas to solidify catalyst and form solid catalyst;

means for separating the solid catalyst from the kiln exhaust gas to form recycled catalyst; and means for introducing at least some of the recycled catalyst as catalyst into the uppermost or next-to-uppermost cyclone stage of the cyclone preheater.

15. The plant according to claim 14, wherein the means for extracting a partial amount of a kiln exhaust gas stream containing vaporized catalyst comprises a duct connected to the kiln.

16. The plant according to claim 15, wherein the means for cooling the extracted kiln exhaust gas to solidify catalyst and form solid catalyst comprises air injection means in communication with the duct for injecting air into the exhaust gas stream in the duct during operation of the plant.

17. The plant according to claim 16, wherein the means for separating the solid catalyst from the kiln exhaust gas to form recycled catalyst comprises a stack.

18. The plant according to claim 17, further comprising means for conveying the recycled catalyst to a raw mill plant that is in communication with the preheater.

19. The plant according to claim 17, further comprising means for convoying the recycled catalyst to the preheater.

20. The plant according to claim 15, wherein the means for cooling the extracted kiln exhaust gas to solidify catalyst and form solid catalyst comprises water injector in communication with the duct to cool the vaporized catalyst by contact with water during operation of the plant.

21. The plant according to claim 20, wherein the means for separating the solid catalyst from the kiln exhaust gas to form recycled catalyst comprises a stack.

22. The plant according to claim 21, further comprising for conveying the recycled catalyst to a raw mill plant that in communication with the preheater.

23. The plant according to claim 21, further comprising means for conveying the recycled catalyst to the preheater.

24. The plant according to claim 14, wherein the cyclone preheater comprises three cyclones in communication with one another and a calciner in communication with at least one of the cyclones.

25. The plant according to claim 24, wherein the cyclone preheater comprises two cyclones connected by exhaust gas duct.

26. The plant according to claim 25, further comprising a raw mill plant connected to the exhaust gas duct for introducing raw materials into the preheater.

27. The plant according to claim 25, further comprising an opening in the exhaust gas duct constructed and arranged for receiving the catalyst.

28. The plant according to claim 24, further comprising a separating cyclone in communication with the calciner.

29. The plant according to claim 24, further comprising a fan constructed and arranged to drive exhaust gas from the kiln up through the calciner and preheater.

* * * * *